United States Patent [19]

Moser et al.

[11] 4,006,214
[45] Feb. 1, 1977

[54] PROCESS FOR THE RECOVERY OF FLUORINE FROM AN AQUEOUS SOLUTION

[75] Inventors: Erwin Moser, Rheinfelden; Hans-Georg Morawe, Mannheim, both of Germany

[73] Assignee: Swiss Aluminium Ltd., Neuhausen am Rheinfall, Switzerland

[22] Filed: Sept. 27, 1973

[21] Appl. No.: 401,216

[30] Foreign Application Priority Data

Sept. 29, 1972 Switzerland ............. 14291/72

[52] U.S. Cl. .................. 423/112; 423/490; 423/551; 210/37 R; 210/38 R; 75/101 BE
[51] Int. Cl.$^2$ .............. C01D 5/00; C01D 3/02; C02B 1/56; C02B 1/42
[58] Field of Search .......... 423/112, 118, 490, 551; 210/37, 38, 37 R, 38 R; 75/101 BE

[56] References Cited
UNITED STATES PATENTS

| | | | |
|---|---|---|---|
| 3,458,440 | 7/1969 | Schmidt | 210/37 X |
| 3,661,775 | 5/1972 | Miyahara et al. | 210/37 |

OTHER PUBLICATIONS

The Permutit Co., 1956, pp. 3–5, copyright 1956.
"Ion Exchange Resins," book by Robert Kunin, 1958 Ed., p. 60, John Wiley & Sons, Inc., New York.
The Permutit Co., "Demineralization including Silica Removal," 1956, pp. 9 and 12.

*Primary Examiner*—Edward Stern
*Attorney, Agent, or Firm*—Ernest F. Marmorek

[57] ABSTRACT

A process for the treatment of aqueous solutions containing cations and anions, including aluminum sulphate and fluoride ions, for the recovery of the fluorine contained in the aqueous solution by means of an ion exchange plant, in which the aqueous solution flows through at least a strong acid cation-exchanger filter step, then a first weak basic anion-exchanger filter step which produces an almost complete separation of the sulphate ions, and after that a second weak basic anion-exchanger filter step which separates out the fluorine ions, and the fluoride is recovered from an eluate obtained during regeneration of the second anion-exchanger filter step.

8 Claims, 1 Drawing Figure

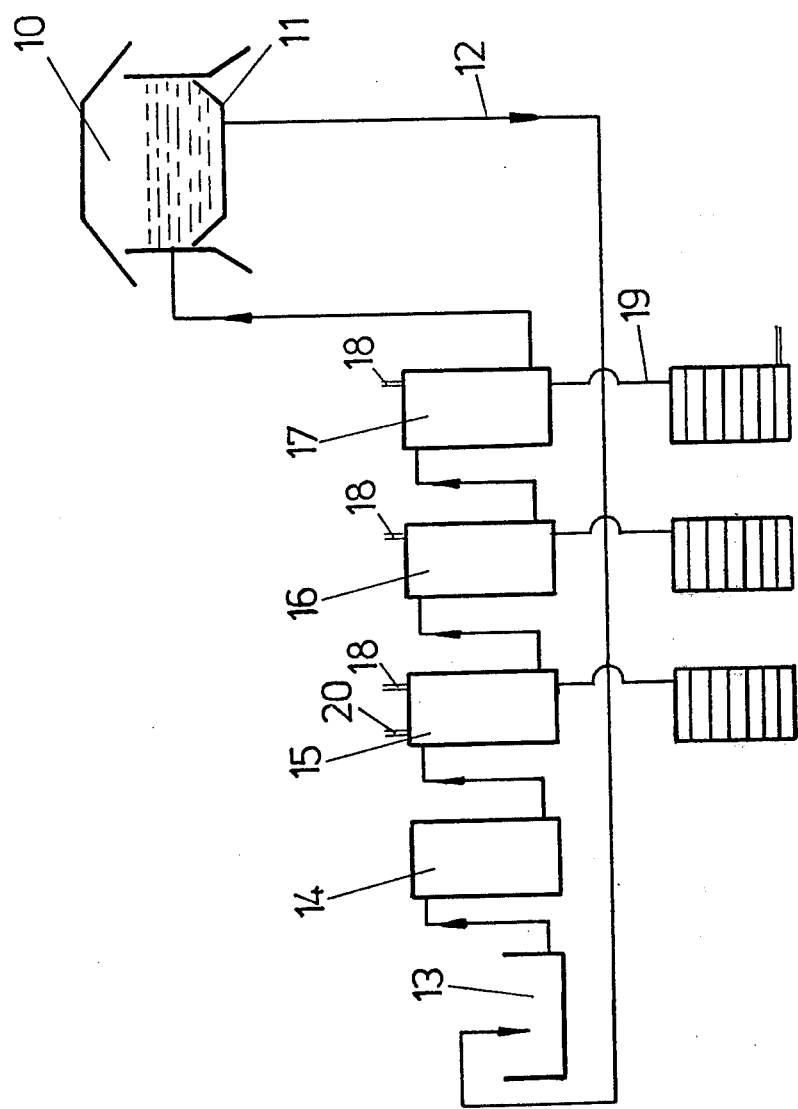

4,006,214

PROCESS FOR THE RECOVERY OF FLUORINE FROM AN AQUEOUS SOLUTION

The invention concerns a process for the treatment of aqueous solutions containing cations and anions, among them being aluminum, sulphate and fluorine ions, in order to recover the fluoride in the aqueous solution, by means of an ion-exchange filter plant.

In a series type process there occur waste products such as solids, waste water and exhaust gases which arise from the process and which in a non-purified form would be an intolerable burden on the environment. In order to avoid such a burdening of the environment a considerable expenditure is given over to the treatment of these waste products, the said expenditure being a financial burden on the processes.

In the aluminium industry for example there occur considerable quantities of waste gases which contain dust, tar vapour and quantities of halogenous gases containing e.g. fluorine, these impurities being released during the electrolysis of the aluminium electrolyte. The flourine in the gas is not present as elemental fluorine but in compound forms and as fluoride. In order to achieve bearable, hygenic working conditions these exhaust gases are led away from the electrolysis cells and purified before being released to the environment. Usually in the purification process the solids are removed from the gas stream by filtration and the soluble gaseous components are removed by scrubbing.

The scrubbing requires not only the supply of large quantities of washing fluid per volume of waste gas cleaned, but also the treatment of these fluids in order to prevent the constituents of the waste gas, now dissolved in the washing fluid, from having a harmful effect on the whole of the water system. The treatment takes place at present by the use of lime which causes the constituents of the waste gas dissolved in the washing fluid to be precipitated. By this treatment large quantities of mud are formed and these are not easy to dispose of but have to be dumped in a controlled and therefore expensive manner.

The object of the invention is to produce a process for the treatment of, aqueous solutions in particular spray water used for the purification of exhaust gases from aluminium electrolysis cells containing amoung other ions fluoride and by which process fluoride dissolved in the aqueous solution is able to be recovered, and the object is fulfilled by a process of the kind described at the beginning in that the aqueous solution flows through at least one strong acid cation-exchange filter step subsequently a first weak basic anion-exchange filter step which effects a complete separation of the sulphate ions, and following that, through a second weak basic anion-exchange filter step which separates out the fluorine ions, and finally fluoride is recovered from an eluate regenerating this second anion-exchange filter step.

In accordance with the invention recovery of fluoride from the eluate regenerating of second anion-exchange filter step for an optimum recovery, the process in accordance with the invention is so arranged that the aqueous solution leaves the cation-exchange filter step with a metal cation content of 0.001 to 50 mg/l perferably 0.5 to 1.0 mg/l. In accordance with the invention a complete elimination of the metal cations from the aqueous solution is to be aimed for.

By operating the cation-exchange step in this way, fluctuations in the loading capacities of the anion-exchange steps which follow, can occur. Surprisingly it was found that aluminium present in the form of aluminium-flouride complex ions in spray water being treated has a breakthrough much more rapid as metal cations and that relatively quickly arrives at an equilibrium in aluminium concentration in the inflow and outflow of this step. If the breakthrough of the aluminium fluoride complexes, and their rise in concentration in the effluent of the cation-exchange filter operating at that moment, are used as criteria for the end of its useful exchange cycle before being regenerated then, surprisingly, possible fluctuations in the capacity of anion-exchange filters concerned to take up the fluoride are avoided and eliminated.

It is preferred therefore to develop the described invention advantageously by subjecting the aqueous solution to the effect of the cation-exchange filter step until the appearance of aluminum-fluoride ion complexes in filtrate ion effluent of this step. A particularly favourable stabilisation in the capacities is found when the aqueous solution leaves the cation exchange step with an aluminium concentration of 1 to approx. 10 mgAl per litre of effluent. The aluminium concentration is to be taken to mean the aluminium content calculated from the concentration of the aluminium-fluoride ion complex.

Furthermore, by this kind of operation the expenditure on regenerants can be reduced for example from 90 g HCl (100%) per litre of exchanger volume, if operating the exchanger till breakthrough of first monovalent cations, to 60 g HCl per litre of exchanger volume, without as result lowering of loading capacities in subsequent first and second anion-exchange steps.

Furthermore by using this kind of operation the cation-exchange step after their regenerations of anion exchangers rinse water consumption is reduced to less than half. Thus, for example, after regeneration and elution of fluoride from the anion exchange filter of the second, rinse water volumes of only 3 to 4 times the volumes of the exchanger bed are required contrary to 8 times the exchanger bed volume when operating until e.g. the breakthrough of sodium ions which is the usual procedure. Furthermore there is as a consequence a considerable saving in the consumption of water in the process itself, this consumption being reduced from 3.5 – 4.5% of the circulated quantity to 1.5% by the preferred kind of operation.

A high fluorine yield is achieved by means of the invention by increasing sulphate ion content in aqueous effluent of first anion exchange step up to 2 — 50 mg/l and through this fluorine and other accompanying ions being passed on to the second anion exchange step. It has been shown that when aqueous solution leaves first anion-exchange step with given maximum concentration of sulfate ion, fluorine ions are displaced by the sulfate ions from this anion filter step to the following second anion-exchange filter step so that up to the fluorine separation from the aqueous solution no reduction in the yield by loss of fluorine ions takes place. For a certain time, and in fact during the period of full effectiveness of the first step, the aqueous solution is free of sulphate ions. Actually under the operating conditions of the first step, sulphate ions, up to the given concentration per litre, are carried over into the following step in the process. This is however not detrimental to an optimum fluorine yield.

In accordance with the invention the aqueous solution is subjected to the separation of the fluorine ions after the removal of the sulphate ions, whereby the fluorine is recovered from the eluate. It has been found that a very favourable recovery can be obtained if, in accordance with a further useful refinement of the invention, the fluorine ion concentration in the aqueous solution in the second anion-exchange step is brought to equilibrium at the inlet and outlet of the step. In this way a maximum enrichment of fluorine ions in the eluate is reached, thus aiding the very efficient recovery of fluorine. The small quantity of fluorine ions remaining briefly in the aqueous solution is relatively small, and so is negligable. Furthermore this treated fluid can be used again as spray water and so a small concentration of fluorine ions is not harmful.

Surprisingly it was found that, by carrying out the process in accordance with the invention, the quantity of fluoride in the neutral eluate obtained from the second anion-exchange filter step, can be increased if the invention is usefully developed further. This further development requires, in the regeneration of this anion filter of the second anion-exchange step (which is at any given moment charged with fluorine ions), passing through first of all an alkaline fluoride-containing fraction of the eluate of a previous regeneration and having a density greater than 1.005, and then subsequently passing through the proper regenerant solution. By this means fluoride concentration in the neutral portion of the regeneration effluent is increased.

In accordance with the invention, the process will now be explained in greater detail by an example with the aid of the accompanying diagram, for the case of the treatment of spray water used in the scrubbing of exhaust gases in an aluminium reduction plant.

A spray chamber which is situated on the roof of an aluminium reduction plant is denoted by 10. In the spray chamber there are a filter and a mist formed by the sprayed water. This filter binds solid and gaseous constituents of the exhausted air. The spray water is caught in the trough 11 and via a pipe 12 led to a settling tank 13. In settling tank 13 sedimentation of the aluminium oxide fines and other solid particles which were carried over by the spray water from the gases takes place in the corresponding intervals they require. From there the spray water passes on to a filter 14 in which the coarse and fine dispersed particles are separated. The filter 14 can be of the pressure, gravity, precoat, or candle type. Various devices can also be considered for this step if they are suitable for the removal of these particles contained in the spray water.

Cleaned of all dirt particles spray water then enters a strong acid cation-exchange filter step 15. The cations such as Ca, Mg, Fe, Na, Al etc. are held back in this step. The spray water effluent from step 15 is nearly completely decationized. The water from step 15 then enters the first weak basic or intermediate basic exchanger filter step 16. Here the sulphate ions are bound and almost completely separated from the other ions, mainly ions of fluorine but also chlorine, nitrate etc. The fluid treated in this way then flows through a second weak or intermediate basic anion-exchange filter step 17 in which the fluorine ions together with traces of chlorine, nitrate and other ions become bound. The formerly spray water, discharged from step 17 then is practically deionised water with a residual conductivity of 1 - 50 $\mu$S/cm; it is then returned to the spray chamber 10 to begin again with the washing of the air exhausted from the reduction plant.

Treatment of spray water is described precedingly as a closed circuit process. This kind of operation is preferred because it allows a reduction in the consumption of water for cleaning waste gases to a minimum. If the practically deionised water can be re-used for other purposes then it can be taken from step 17. In this case the treatment is not operated as a closed circuit process but as a pass through process. One aluminium reduction plant is always in operation and consequently spray water from chamber 10 is to be treated without interruption. For this purpose the filter 14 and those of steps 15, 16 and 17 are usefully provided each in duplicate so that when cleaning the filter 14 or regenerating steps 15, 16 and 17 a substitute is always available. The filter unit, which is at any given time the duplicate is to advantage, interchangeably connected in series, but can also be run when connected parallel.

Inlet pipes for regenerants and wash water are denoted by 18 on the steps 15, 16 and 17 and the outlet pipes for these steps are denoted by 19. The outlets can be connected again to the filters. However for the purpose of clarity the drawing has been made highly schematic.

In accordance with the invention the cationfilter of exchange step 15 remains in service until the aqueous solution in the spray water effluent from it has a metal ion content of 50 mg/l maximum. However a metal ion content of the order of 0.05 - 1.0 mg/l is preferred since through this the fluorine yield and the economics of the process are improved for example by reducing the water consumption of the equipment.

However, as was mentioned earlier, in order to suppress fluctuations in capacity, it is preferred to continue operating only until aluminium fluoride ion complex appears in the filtrate, advantageously in the given concentration.

In order to guarantee continuous treatment of the spary water, two or more cation-exchange filters are provided usefully connected interchangeably one behind the other. The filter which at any given moment is in the first position is taken out of service when metal cations or the mentioned complex for the regeneration appear, and the second filter is put into operation (as the first). The regeneration of the strongly acidic cation exchanger takes place preferably with dilute hydrochloric or sulphuric acid. In the case of sulphuric acid the special known methods of regeneration making use of softened diluting and/or additional water is necessary, are to be taken into consideration. The regeneratiin can, however, take place with other known dilute acids. The exhausted filter is back washed in order to loosen up the exchanger bed and to wash out any possible dirt particles, and then regenerated with dilute acid in the downflow direction before finally washing free of acid. Regeneration in downflow direction is preferred to regeneration in the upflow direction in order to minimise the layering of the cation-exchanger bed.

The kind of operation in accordance with the invention provides for the running of the first anion-exchange filter of step 16 until completely charged with sulphate ions with a corresponding displacement of the formerly adsorbed $F^-$, $Cl^-$ and $NO_3^-$ ions of this exchanger.

After each regeneration, except for a short start-up period through first filter unit 16, during the whole of its period in service, flows a fully de-alkalized water from step 15, the fluorine ion and other monovalent anion content of which is at approximately the same level at the inlet and outlet; but in contrast the sulphate ion content in the effluent is almost constantly zero up to its first breakthrough since these ions are captured completely in filter 16. The first filter of step 16 arranged next to a second filter, the two being usefully connected one behind the other, is taken out of service only when the filtrate reaches a sulfate-ion concentraton of up to 50 ml/l since in this way the most extensive displacement of the fluorine ions, which are captured only in the next filter step viz, step 17, is assured, allowing a best possible recovery of fluorine. The regeneration of each first unit of filter step 16 takes place by backwashing the anion-exchanger bed in order to loosen it up, and after that the free board water on the top of the bed is drained off. Under certain circumstances the water used for backwash and the free board water can be recycled to compensate for losses in the process. Consequently, for example, a dilute caustic soda solution warmed up to 30–35° C and in a quantity corresponding to 3 - 20 m³/h per m³ of exchanger resin is passed through. From the regeneration there is obtained first a fraction of neutral eluate consisting of sodium sulphate solution, and then a fraction of eluate of variable alkaline concentration (strong, weak). The weak solution is led off to an application which is still to be described.

The separation of the fluorine ions takes place in the anion-exchange filter step 17 which is connected next in series to the filter 16. Step 17 consists usefully of two filters connected in series. The filter unit of step 17, which is at any given moment the first filter, remains in service until the fluorine ion content of the aqueous solution i.e. the spray water is brought to a concentration equilibrium at the inlet and outlet. Since the filtrate from step 17 is led to the spray chamber 10, the permissible fluoride concentration can, briefly, be that at the inlet in order to achieve a maximum loading of the exchanger bed with fluorine ions by exploiting the full capacity of the weak or intermediate basic anion exchanger of 17.

Should the quantity of fluorine flowing through produce some interference then the arrangement of a second filter in series offers the advantage that this one captures the slip of fluorine and other ions not captured in the first filter i.e. the total quantity of ions passing through is captured, this not being possible with an arrangement of filters in parallel trains. In this way, in spite of a certain quantity of fluorine ions passing through, it is assured that practical de-ionised water with a residual conductivity between 2 and 50 $\mu S/cm$ and a residual fluorine ion content smaller than 0.5 mg/l, can be led off to the spray chamber or to waste pipe according to the kind of operation chosen.

After reaching the fluorine-ion concentration equilibrium at the inlet and outlet of the filter operating as the first filter of step 17 at any given moment, the said filter is taken out of service for regeneration and elution of the fluorine and traces of other ions. During this regeneration time the plant can be operated further with only the second filter, of step 17 which now takes the place of the first filter. After the elution and regeneration of the filter taken out of service, this filter is then put back into operation as the second or last filter. By this mode of operating the exchanger a loading of up to 22 - 27 gF'/l of exchanger can be achieved. This in not difficult to eluate for example with caustic soda as NaF.

Likewise the regeneration takes place by backwashing the anion-exchanger bed and draining off the back wash water and free board water on the top of the bed. Both types of waters can be recycled in a closed circuit - system to compensate for losses. Dilute caustic soda at 30° – 35° C is then passed through the bed at a rate of 3 – 20 m³/h per m³ of exchanger resin. A neutral eluate fraction consisting mainly of a sodium fluoride solution is obtained and further one strong and one weak-alkaline fraction of caustic soda and water are obtained by rinsing the filters free of caustic soda.

The cation-exchange filter step 15 is regenerated with hydrochloric acid. The strong alkaline fraction of the eluate of step 16 is used to neutralise the excess hydrochloric acid. The strong alkaline fraction of the eluate of step 17, as will be explained later in greater detail, is advantageously piped off for a pre-elution first filter of step 17.

As was mentioned earlier, in addition to the strong alkaline fraction, a weak alkaline fraction is obtained from the steps 16 and 17 by rinsing off of the regenerant NaOH. These weak basic solutions can, likewise, be used for diluting caustic soda which is to be used for regeneration purposes, as long as the residual conductivity of these weak basic solutions is higher than 300 $\mu S/cm$. The parts of these solutions having lower conductivity values are re-circulated.

The sodium fluoride solution from the then first anion filter of step 17 is piped off to the cryolite recovery or for re-use in some other application. The solution containing mainly sodium sulphate, from the filter which is at any particular moment the first filter of step 16, can be used elsewhere. By the previously mentioned regeneration and elution technique applied to both anion-exchange steps 16 and 17, the regenerants are utilised economically and at the same time the cost of chemicals and the consumption of feed water circulating in the plant is reduced to a minimum.

Surprisingly it was found that by operating the process in accordance with the invention the quantity of fluoride obtained in the neutral eluate from step 17, could be increased from 22 – 27 gF⁻/l to 33 – 36gF⁻/l of anion exchanger, if the strong alkaline eluate fraction of step 17 is used for a pre-elution before the final proper regeneration. In this way an increase of 35 – 45% in the fluoride concentration is achieved. The concentration of fluorine ions in this neutral eluate increases by this procedure from 12 – 14 gF⁻/l to about 15 – 16 g F⁻/l of neutral eluate.

A further clarification using the process in accordance with the invention is given in the following example

EXAMPLE

The water obtained after spraying in the scrubbing chamber of the waste gas purification equipment in the main pot room of an aluminium reduction plant, after about 18 hours sedimentation time to precipitate the alumina fines, has the following variable composition.

| | | |
|---|---|---|
| pH | 3 – 4 | |
| $Na^+$ | 10 – 40 | mg/l |
| $Ca^{++}$ | 10 – 50 | " |
| $Mg^{++}$ | 2 – 5 | " |
| $Al^{+++}$ | 5 – 20 | " |

-continued

|       |       |           |      |
|-------|-------|-----------|------|
| total | Fe    | 3 – 10    | "    |
|       | F⁻    | 50 – 200  | "    |
|       | Cl⁻   | 3 – 20    | "    |
|       | SO₄⁻⁻ | 10 – 60   | "    |
|       | NO₃   | 1 – 5     | "    |
|       | Si    | 0.1 – 0.5 | "    |

This spray water contained 10 – 15% of untreated water which had been added. The composition of the water added being as given in the following table:

|       |       |           |      |
|-------|-------|-----------|------|
|       | pH    | 7.0 – 7.6 |      |
|       | Na⁺   | 6 – 12    | mg/l |
|       | Ca⁺⁺  | 70 – 80   | "    |
|       | Mg⁺⁺  | 10 – 13   | "    |
|       | Al⁺⁺⁺ | 0 – 0.5   | "    |
| total | Fe    | 0.1       | "    |
|       | F⁻    | 0.1       |      |
|       | Cl⁻   | 15 – 20   | "    |
|       | NO₃   | 4 – 6     | "    |
|       | SO₄⁻⁻ | 30 – 35   | "    |
|       | Si    | 2 – 3     | "    |

By means of a sampling device waste water is drawn off continuously and pumped into another container for untreated water, from which samples for analytical supervision are taken at specific intervals.

From this container the spray water is conducted to the actual ion exchange circuit of the plant at a rate of approx. 1 m³hour and at a pressure of 4 atmospheres. The ion-exchange circuit is laid out as follows:

A candle filter loaded with 8 candle filters and having a filter area of approx., 1.3 m².

Two cation filters, interchangeably connected to each other in series, and each filled with 160 l of strong acid cation-exchanger LEWATIT S 100 (Bayer AG, Leverkusen);

One anion filter filled with 100 l macro-porous weak to intermediate basic anion-exchanger LEWATIT MP 64;

Two anion-filters which are connected interchangeably in series and each filled with 100 l of macro-porous weak to intermediate basic anion-exchanger LEWATIT MP 64.

All cation and anion filters are rubber-coated steel pressure filters cylindrical in shape with the same dimensions viz., 400 mm diameter and 2000 mm height, each having lower sealing flap, and a filter bottom welded in and provided with blast pipet. The equipment is connected in such a way that each filter unit can be by-passed and can be switched on or off at various places of choice.

Suitable devices permit samples to be taken before and after each filter and in the same way the quantity of water flowing through each filter can be measured.

The treated water flowing out of this equipment is led first of all to a container for collecting purified water. Additional untreated fresh water flows continuously into this container to make up for the loss of spray water by evaporation and for the loss through consumption of water by the ion exchange plant itself. From this container the mixed water is pumped continuously into the spray chamber of the reduction plant purification equipment for exhaust gases where it is sprayed and then again led off to the sedimenting tank.

When the candles of the candle filter become dirty, as is indicated by pressure drop, then they are cleaned by forceful back-washing and when a clear filtrate is obtained the filter is again returned into service. This cleaning of the candles from a coating of fines lasts a maximum of 10 minutes and requires only a short but necessary interruption at long intervals, in an otherwise almost continuous operation of the pilot plant.

The cation filter, which at any given time is in the first position, is run preferably until the appearance of and increase in metal cations (0.5 mg/l Na⁺) or aluminium fluoride ion complexes (5.0 mg/l) in its filtrate, then it is normally backwashed and regenerated in downflow direction with a 6% by weight soluton of hydrochloric acid in the amount of 90 g HCl, calculated as 100%, per litre of cation exchanger. This differs from usual kind of operation of cation exchange filters units, i.e. up to decrease of minus-m-value or minus-p-value, which in this case here is not practicable.

By operating the cation filter until the breakthrough of metal cations (Na⁺) the eluate from the filter step 17 contains a fluoride quantity of 22 – 27 g F⁻/l of ion exchanger which increases to 33 – 36 gF⁻/l if the strong alkaline fraction of the eluate from the filter step 17 is used for a pre-elution before the proper regeneration of step 17. By this mode of operation by which the switching-off is determined by the metal cation content, the fluoride is obtained in fluctuating amounts within the given limits. If on the other hand the cation filter is run only until the breakthrough of the aluminium fluoride ion complexes then the quantity of fluoride is adjusted to a fixed value within the given ranges. In this way constant fluoride quantities of 26 – 27 gF⁻/l and 35 – 36 gF⁻/l of exchanger were obtained with the pilot plant. The advantages which accompany a constant fluoride quantity as a measure for a constant capacity of the filters of step 17, were explained previously in detail.

The regenerating acid is neutralised in suitable tanks using the waste alkaline liquor from the anion steps. Partly reusing the unneeded regenerating acid fraction was not found to be of advantage. However recycling the drained off rinse water fraction whose sodium ion content is the same or less than that of the supplied wash water, produces a not negligible reduction in the water consumed by the plant itself.

The anion filter of the first anion step is run with the completely de-cationised water leaving the cation filters connected before it, (the filter occupying the second place captures the slip in filtrate from the first until the analytically determined increase in sulphate ions in the filtrate is about 50 mg/l.

The fluorine ions, and smaller quantities of chlorine and nitrate ions appear very soon after bringing this freshly regenerated anion filter into service. The concentration of these ions in the filtrate remains approximately the same (and constantly so for a relatively long time) as that in the inlet. These monovalent ions are passing through in this anion exchanger bed and the originally fixed ions of this kind ae displaced from it. (with increasing charging of the exchanger with sulphate ions) and passed on to the second anion filter step (fluoride step) which follows. This increase in charge is seen clearly towards the end by an increase in the fluoride concentration to e.g. about 115 mg F⁻/l, when, by way of comparison the concentration at the outlet is 90 – 95 mgF⁻/l.

When the maximum charging with sulphate ions has occured, (after the first breakthrough a relatively rapid increase in the filtrate can be observed), the filter and in the present case the whole purification plant is taken out of service. The running time of this anion filter for binding and separating the sulphate ions amounts on the average to about four weeks between two regeneration treatments.

After normal back-wash of anion exchanger bed and after its regeneration at 35° C, with a 4% caustic soda, solution with an amount of 125 g NaOH per litre of LEWATIT MP 64 the eluate was analyzed and the following charges per liter of anion exchanger were determined: 65,5 g $SO_4^{--}$, 6,6 g $F^-$, 1.7 g $Cl^-$, 0.6 g $Al^{---}$, 0.8 g $NO_3^-$.

The first neutral eluate fraction, obtained on regenerating this anion filter, contains on the average about 20 – 25 g $SO_4/l$ as sodium sulphate and can be taken away for a suitable re-use.

The second alkaline eluate fraction is used for neutralising the waste regenerating acid, the subsequent only slightly alkaline third fraction of the eluate is pumped, together with the first alkaline quantity of regenerating rinse water, to dilute the caustic soda for the next regeneration of this step. The rinse water portion with a conductivity of less than 300 μS/cm is, in this example, recirculated. After the regeneration is completed the filter is put back into service.

Of the two interchangeable series-connected anion filters of the so-called fluoride step, the filter which at any given moment is the first, is run until fully charged with fluorides, as indicated by continual analytical supervision when the concentration of fluoride has reached an equilibrium at the inlet and outlet, and is then taken out of service for regeneration and elution of the captured fluorine ions. Up to this time the second anion filter captures particularly the $F^-$ and the other mentioned monovalent ions in the slip from the first anion filter and it is therefore already pre-charged. The filtrate of the second anion filter is led into a collecting tank for purified water and this filtrate contains less then 0.5 mg $F^-/l$ and exhibits a residual conductivity of, for example, 2 – μS/cm, both during this operating time as the second filter and during the regeneration of the filter which occupied first place.

The filter which had operated as the first filter until then is regenerated and eluted as follows:

After back-washing for about 5–10 minutes this backwash water volume is returned into circulation and the so called freeboard water is drained off and likewise put back into circulation. A pump then forces about 200 l of strongly alkaline second eluate fraction, in part charged from a previous regeneration, on and through the exchanger bed. This fraction contains for example:

| 4275 g | free NaOH |
|---|---|
| 627 g $F^-$ | |
| 81 g $Cl^-$ | |
| 2 g $NO_3^-$ | |
| 4 g $SO_4^{--}$ | |
| 0 g Al | |

Immediately after this 130 l of 4% caustic soda solution at 35° C (i.e. on the whole 5.36 kg NaOH) is forced through the exchanger bed with the same flow rate of 5 $m^3h$. per $m^3$ of anion exchanger as before. The outlay in regenerant amounts correspondingly to 96.5 g NaOH/l LEWATIT MP 64.

By simple supervision of the pH-value, the neutral first fraction of eluate which is run off can easily be caught separately and led to the cryolite recovery. By this procedure the concentration of fluorine in the first neutral eluate amounts to 16.3 g $F^-/l$.

On the basis of the different densities, the strong basic second eluate fraction is separated from the slightly basic third eluate fraction which contains only small quantities of caustic soda and less than 0.3 g$F^-/l$ and is used for pre-elution in the next regeneration. The slightly alkaline third eluate fraction with a density of less than 1.005 is utilised completely to dilute the regenerating caustic soda solution. A first part of the rinse water obtained is used for this purpose too.

Of the rinse water remaining, that part with a conductivity higher than 300 μS/cm is pumped into the acid neutralising tank and the part with lower conductivity is pumped back into circuit.

The mainly hydroxide fines which are obtained from time to time in this tank have a water content of about 80% and, as determined by a tentative filtration, are compact. The quantity of fines amounts to about 25 – 30 kg dry substance per $m^3$ eluate of the cation-exchange filter step. With charging with sulphate ions, anion-exchanger bed of the first anion filter step exhibits a volume increase of 42–45% compared with its volume in the regenerated and washed condition.

The volume increase of the fluoride step exchanger beds amounts, on the average, to about 35 – 40% on charging wih fluorine ions.

The loss of water by evaporation from the circuit, amounts to 11 –16% depending on the operating and weather conditions; the consumption of water by the described plant itself is about 1.5% of the amount circulated, if the cation-exchange filter is run until the appearance of aluminium fluoride ion complexes.

What we claim is:

1. In a process for the treatment of aqueous solutions containing metal cations including aluminum ions and anions including sulphate and fluoride ions by means of an ion-exchange plant having ion exchange filter means, the steps comprising
passing the aqueous solution through at least one strong acid cation-exchange filter means to remove substantially all of the metal cations including aluminum ions;
subsequently passing the emerging aqueous solution through a weak basic anion-exchanger filter means wherein the sulphate ions are selectively and nearly completely recoverably retained due to the greater affinity of said first weak basic anion-exchanger filter means for sulphate ions over fluoride ions;
passing the thus nearly completed desulfated aqueous solution through a second weak basic anion-exchange means wherein fluoride ions are recoverably retained.

2. In a process for treatment of aqueous solutions, as claimed in claim 1,
further comprising the steps of
regenerating said first basic anion exchange means by elution with a predetermined aqueous solution comprising sodium hydroxide; whereby said sulphate ions are recovered as an enriched solution in the regeneration eluate substantially as an aqueous sodium sulphate solution.

3. In a process for treatment of aqueous solutions, as claimed in claim 1, further comprising the step of regenerating said second basic anion exchange means by elution with an aqueous solution comprising sodium hydroxide, whereby said fluoride ions are recovered as an enriched solution in the regeneration eluate substantially as an aqueous sodium fluoride solution.

4. A process in accordance with claim 1, in which the cation-exchange means is operated until the solution leaving the said cation exchanger has a metal-cation content between 0.001 and 50.0 mg/l.

5. A process in accordance with claim 1, in which the cation-exchange means is operated until the aqueous solution has a metal ion content of about 0.05 – 1.0 mg/l.

6. A process in accordance with claim 5, in which the cation exchange means is operated until the solution leaving the said cation-exchanger means has an aluminium concentration of 1 to about 10 mg Al per litre.

7. A process in accordance with claim 1 in which the anion-exchanger of the first anion-exchange filter step is operated until the sulphate ion content of the solution leaving the said anion-exchange filter means is between 2 and 50 mg/l, and as a result of this, fluorine and other accompanying ions become displaced on to the second anion-exchange filter means.

8. A process in accordance with claim 1 in which the second anion-exchange filter means is operated until the fluorine ion content of the solution leaving said anion-exchange filter means is substantially in equilibrium with the fluorine ion content of the solution entering said second anion-exchange filter means.

* * * * *